United States Patent [19]

Hönel et al.

[11] 4,430,494
[45] Feb. 7, 1984

[54] MELAMINE RESINS, A PROCESS FOR THEIR PREPARATION AND THEIR USE AND MOLDING COMPOSITIONS PRODUCED FROM THE RESINS

[75] Inventors: Hans Hönel; Walter Michel, both of Frankfurt am Main; Steffen Piesch, Oberursel; Karin Schlüter, Frankfurt am Main; Alfons Wolf, Seligenstadt; all of Fed. Rep. of Germany

[73] Assignee: Cassella Aktiengesellschaft, Frankfurt am Main, Fed. Rep. of Germany

[21] Appl. No.: 429,464

[22] Filed: Sep. 30, 1982

[30] Foreign Application Priority Data

Feb. 9, 1981 [DE] Fed. Rep. of Germany ....... 3104420

[51] Int. Cl.³ .............................................. C08G 12/30
[52] U.S. Cl. .................... 528/254; 524/593; 525/398; 528/265
[58] Field of Search ............... 528/254, 265; 524/593; 525/398

[56] References Cited

U.S. PATENT DOCUMENTS 4,183,832 1/1980 Meunier et al. ............... 528/254
4,271,286 6/1981 Michel et al. ................. 528/254
4,303,561 12/1981 Piesch et al. .................. 528/254
4,369,286 1/1983 Czepel et al. .................. 528/254

FOREIGN PATENT DOCUMENTS 673742 6/1952 United Kingdom .

Primary Examiner—Lucille M. Phynes
Attorney, Agent, or Firm—Connolly and Hutz

[57] ABSTRACT

Modified melamine-formaldehyde resins having a melamine:formaldehyde molar ratio of 1:(1.27 to 0.7) are prepared by heating melamine in an aqueous solution or suspension with formaldehyde in a melamine:-formaldehyde molar ratio of 1:(1.27 to 0.7) at a pH value of 8 to 11 and at temperatures of 105° to 160° C. until the finished resin has reached a dilutability with water of 1:(0.1 to 4) at 20° C., and, before, during or after the condensation reaction, adding less than 25% by weight of a glycol ether of the formula $$R(OCH_2CH_2)_nOH$$

in which R denotes alkyl having 1 to 4 C atoms and n denotes an integer from 1 to 5, and/or of p-toluenesulfonamide. The resins are used in particular for the production of molding compositions.

12 Claims, No Drawings

MELAMINE RESINS, A PROCESS FOR THEIR PREPARATION AND THEIR USE AND MOLDING COMPOSITIONS PRODUCED FROM THE RESINS

The invention relates to melamine resins which have a molar ratio of melamine to formaldehyde of 1:(1.27 to 0.7), which have been modified with glycol ethers and/or p-toluenesulfonamide and which can be diluted with water to a limited extent, to a process for their preparation and to their use for the production of molding compositions, and also to the molding compositions produced from the resins.

Melamine resins are prepared by reacting melamine and formaldehyde. Owing to the property of curing irreversibly, they have a wide industrial use, for example for the production of curable molding compositions, decorative laminates, textile finishing agents, lacquers and glues.

Moldings of a very wide variety of types, such as, for example, kitchen crockery, trays, casings for telephones, radios, clocks and television sets, buttons, valves, electrical insulation components and the like are prepared from curable molding compositions by the action of mechanical forces with a certain temperature range. Low values of shrinkage during processing and after-shrinkage must be maintained in the production of fairly large moldings, in order to enable the moldings to be processed satisfactorily and to prevent the moldings subsequently cracking. Requirements of this type are met, for example by phenolic resin molding compositions, but particularly by polyester resin and epoxide resin molding compositions. In some cases the resins required for their production are extensive and the moldings produced therefrom in some cases still have undesirable thermoplastic properties or are not adequately resistant to solvents or heat. Moldings which are used in the electrical industry, such as, for example, switches, knobs, fuse holders, chassis components, mountings for transistors, integrated circuits and the like must, in addition, be track-resistant to an adequate extent.

Molding compositions which have been prepared on the basis of customary melamine resins display higher figures of after-shrinkage during curing than do, for example, molding compositions based on phenolic resins and particularly on polyester or epoxy resins. Hitherto, therefore, it has only been possible to use customary melamine resins for the production of molding compositions or moldings in cases where the tolerances to be maintained have been large and the heating slight. Although it has been known that subsequent shrinkage can be decreased in the production of molding compositions by using high proportions of special inorganic fillers for example hydrated aluminum oxide (compare German Offenlegungsschrift No. 2,356,298), ground minerals and the like, in most cases it has then been necessary to accept poorer flow properties when processing the molding compositions.

Electrolyte-free melamine resins from which moldings having a high electrical resistance and a high electrical tracking resistance can be produced, are known from German Offenlegungsschriften Nos. 2,603,767 and 2,603,768. However, the shrinkage during processing and after-shrinkage of the molding compositions produced using these known melamine resins is still too great for the production of fairly large moldings.

British Patent Specification No. 673,742 discloses melamine resins which are prepared by subjecting melamine and formaldehyde to a condensation reaction in a molar ratio of 1:(1 to 1.7) in aqueous solution at a pH value of 7 to 11, and from which compression molding compounds having shrinkage during processing of only 0.69% can be produced.

German Offenlegungsschrift No. 2,824,473 discloses partially etherified liquid melamine resins having a molar ratio of melamine to formaldehyde of 1:(1.25 to 1.0), from which it is possible to prepare molding compositions which exhibit only a very small shrinkage during processing and after-shrinkage. Glycols and glycol ethers are employed in amounts of more than 26% by weight, for example 34 to 43% by weight, relative to the solids content of the resin, in the preparation of these resins. From their preparation, therefore, the finished liquid resins still contain such high proportions of the high-boiling glycol ethers that they cannot be converted into powder resins, which are preferred for the production of molding compositions. In addition, it has been found that the moldings produced from these molding compositions have an unsatisfactory behavior in fire for some purposes.

It has now been found that, when preparing melamine resins having a molar ratio of melamine to formaldehyde of 1:(1.27 to 0.7) which have been modified by glycol ethers and which are suitable for the production of compression molding compositions having a very low shrinkage during processing and after-shrinkage, the content of modified glycol ethers can be reduced to quantities less than 25% by weight, preferably to quantities equal to or less than 15% by weight, relative to the total weight of the melamine and formaldehyde employed (formaldehyde being calculated on a 100% basis). Liquid resins of this type can also be converted into powder resins in a manner which is in itself known.

The invention relates to modified melamine-formaldehyde resins having a molar ratio of melamine to formaldehyde of 1:(1.27 to 0.7) and a content of less than 25% by weight, relative to the total weight of melamine and formaldehyde (formaldehyde being calculated on a 100% basis) of a glycol ether or of several glycol ethers of the formula I $$R(OCH_2CH_2)_nOH \qquad (I)$$

in which R denotes alkyl having 1 to 4 C atoms and n denotes an integer from 1 to 5, and/or p-toluenesulfonamide.

In the formula I R preferably denotes methyl and very particularly preferentially ethyl, and n preferably denotes 2, 3 or 4. The molar ratio of melamine to formaldehyde in the resins according to the invention is preferably 1:(1.25 to 1.01) and the content of modifying agents, glycol ethers of the formula I and/or p-toluenesulfonamide, is preferably equal to or less than 15% by weight, relative to the total weight of melamine and formaldehyde (formaldehyde being calculated on a 100% basis).

The melamine resins according to the invention are prepared by heating melamine in an aqueous solution or suspension with formaldehyde in a molar ratio of melamine to formaldehyde of 1:(1.27 to 0.7), preferably 1:(1.25 to 1.01), at a pH value of 8 to 11, preferably 8.5 to 10.5, at temperatures of 105° to 160° C., preferably 110° to 130° C., until a dilutability with water of 1:(0.1 to 4), preferably 1:(0.1 to 3), has been reached, and by adding, before, during or after the condensation reaction, less than 25% by weight, preferably 15% by weight or less, relative to the total weight of melamine and formaldehyde (formaldehyde being calculated on a 100% basis), of a glycol ether, or of several glycol ethers, of the formula I and/or p-toluenesulfonamide, and, if appropriate, subsequently converting the resulting liquid resin into a powder resin in a manner which is in itself known.

Since the reaction temperatures are higher than the boiling point of water, the preparation of the resins according to the invention is carried out in a closed pressure vessel under the excess pressure set up in the condensation reaction, advantageously with stirring. The formaldehyde is normally employed in the form of the customary 39% strength aqueous solution. However, it is also possible to employ aqueous solutions of paraformaldehyde or formaldehyde solutions of a higher or lower concentration. The concentration of the formaldehyde in the aqueous solution of the reaction batch can be 10 to 60% by weight, preferably 20 to 40% by weight.

Under the reaction conditions indicated, the melamine dissolves relatively rapidly. For example, in the case of 20-molar to 25-molar batches, the melamine has dissolved after as little as 5 to 10 minutes. After the melamine has dissolved, the dilutability with water of the batch decreases as the condensation reaction proceeds further. Further condensation is normally continued until the finished resin solution has reached a dilutability with water of 1:(0.1 to 4), preferably 1:(0.1 to 3). In determining the dilutability with water, a measured volume of resin is titrated with water in a known manner at a temperature of 20° C. until a permanent turbidity is formed. Quoting a dilutability with water of 1:0.1 thus means, for exammple, that a permanent turbidity is formed if 1 part by volume of resin is mixed with 0.1 part by volume of water. However, if it is desired to prepare a resin having a dilutability with water of, for example, 1:0.1, condensation must not be continued until a sample of resin exhibits this dilutability with water, but the condensation reaction must be discontinued at an even earlier stage by rapidly reducing the temperature, because after-condensation also takes place during cooling. The dilutability with water at which the condensation reaction should be discontinued can be determined easily by preliminary trials.

The pH is adjusted to the figure of 8 to 11, preferably 8.5 to 10.5, by adding suitable inorganic or organic compounds having an alkaline reaction. Examples of suitable inorganic compounds of this type are alkali metal hydroxides, such as sodium hydroxide, potassium hydroxide or lithium hydroxide; or alkali metal carbonates, such as sodium carbonate or potassium carbonate. Examples of suitable organic compounds are tertiary aminoalcohols, such as, for example, N,N-dimethylaminoethanol, N,N-diethylaminoethanol, N,N-dipropylaminoethanol, N,N-dimethylaminopropanol, N,N-diethylaminopropanol or N,N-dipropylaminopropanol. It is also possible to employ mixtures of different suitable compounds having an alkaline reaction, such as, for example, a mixture of potassium carbonate and N,N-dimethylaminoethanol. The compounds used for adjusting the pH value can, of course, also be added to the reaction batch in the form of an aqueous solution. Adjustment of the pH value normally requires, for example, approx. 0.06 to 0.1% by weight of the alkali metal hydroxide and approx. 0.5 to 2% by weight of the tertiary aminoalcohols, relative to the weight of the melamine.

The glycol ethers of the formula I, and/or the p-toluenesulfonamide, which are used for modifying are added to the reaction batch before, during or after the condensation reaction. It is advantageous to add at least part of the quantity of glycol ethers used, and/or of p-toluenesulfonamide, for example 50%, before the start of the condensation reaction. The quantity of the glycol of the formula I and/or of p-toluenesulfonamide used for modifying is 1 to 25% by weight, preferably 2 to 15% by weight, relative to the total weight of melamine and formaldehyde employed (formaldehyde being calculated on a 100% basis). It is also possible to employ a mixture of different glycol ethers of the formula I instead of a single glycol ether. In this respect, a technical mixture composed of 70% by weight of ethyldiglycol, 20% by weight of ethyltriglycol and 10% by weight of ethyltriglycol (sic), which is also known as "ethylpolyglycol", has proved particularly suitable.

The resins which can be prepared in accordance with the present invention can also be modified additionally by means of further modifying agents. It is also possible to add the further modifying agents, which are in themselves known, before, during or after the completion of the condensation reaction. Examples of possible, suitable further modifying agents are glycols, such as ethylene glycol, 1,2-propylene glycol, 1,3-propylene glycol, butane-1,2-diol, butane-1,3-diol, butane-1,4-diol, ethylene diglycol, ethylene triglycol, ethylene tetraglycol, dipropylene glycol, tripropylene glycol, tetrapropylene glycol, polyethylene glycols, and also polyglycerol, trimethylolpropane or pentaerythritol; sugars, such as glucose; and also alcohols, such as methanol or ethanol; lactams, such as ε-caprolactam; methylenebisformamide; and the reaction product formed from formaldehyde, formamide and ε-caprolactam. It is also possible to use as modifying agents other aminoplast precursors and derivatives thereof, for example urea, thiourea, propyleneurea, ethyleneurea, glyoxalurea, formoguanamine, acetoguanamine, benzoguanamine, adipobisguanamine and the like. If sulfamic acid or salts thereof are used for additional modification, not more than 1% by weight, preferably not more than 0.5% by weight, relative to the total weight of melamine+formaldehyde (100% strength), of these are used. The maximum quantities of modifying agents used ensures that, even if alcohols, glycols or glycol ethers are used, virtually unetherified resins are still obtained.

The liquid resins which can be prepared in accordance with the present invention have a solids content of 50% by weight or can be converted into pulverulent resins in a manner which is in itself known by drying, for example by spray drying. The resins according to the invention are preferably used in the form of powder.

As a result of carrying out the condensation reaction in a closed system, the process according to the invention for the preparation of the resins guarantees absolute freedom from environmental pollution. After the reaction temperature has been reached, the condensation reaction takes place rapidly within approx. 20 to 50 minutes. The resulting reduction in the occupation times of the reaction vessels and in the consumption of heat energy leads to a reduction in production costs.

Even when processed further, the resins according to the invention have a low odor and thus cause little environmental pollution when handled and used, and are suitable for all the end uses for which melamine resins have hitherto been used. In particular, they are suitable, either in a liquid form or, preferably, in a solid form, for the production of molding compositions.

The production of the molding compositions is effected in a manner which is in itself known by mixing the resins in a liquid form or, preferably in a solid form with fillers, lubricants and, if necessary, flow assistants and pigments, and a specific degree of condensation is obtained by the application of heat. Examples of suitable fillers are wood flour, cellulose powders, cellulose ester powders, ground minerals, powdered glass, cotton flocks, cotton fibers, cotton fabric clippings, flour, starch, peat, asbestos fibers, mica or graphite, of which the two mentioned first are preferred. Pigments can be organic or inorganic. Suitable inorganic pigments are based in general on sulfides, oxides or mixed oxides of metals, in particular titanium, zinc, iron, chromium, cobalt, lead and cadmium. Carbon black is a preferred black pigment. Suitable organic pigments are the compounds characterized as pigment dyes in the Color Index.

Known flow assistants are sorbitol, glycols and glycol derivatives and polyglycols. Metal stearates, preferably zinc stearate, calcium stearate and magnesium stearate, are employed as lubricants or release agents, which are necessary for detaching the molding satisfactorily from the mold.

The melamine-formaldehyde resins according to the invention are mixed with the filling material and, if appropriate, the further additives in a manner which is in itself known, in general by the so-called dry process or the so-called wet process. In the dry process (also known as the melt impregnation process) approx. 35 to 60 parts by weight of the pulverulent resin are normally mixed with approx. 65 to 40 parts by weight of fillers and also approx. 1 part by weight of lubricant, and also, if appropriate, flow assistants and pigments in a mixing unit. The resulting mixture is then calendered on a roll mixer at temperatures of the so-called hide roll of approx. 100°–140° C. and of the second calender roll of approx. 70°–100° C., to give a mill hide. During calendering, the fillers become homogeneously impregnated with the melting resin, and, at the same time, the degree of condensation of the resulting molding composition rises. The conversion of the crude mixture into the molding composition normally takes approx. 1 to 3 minutes. After reaching the desired degree of condensation, the homogeneous plastic composition is stripped off the hide roll, cooled and then comminuted, for example granulated and ground.

In order to prepare molding compositions by the wet process, the powdered resins are first dissolved in water, or the liquid resins are employed without further treatment. The solids content of the resin solution is as a rule 50–70%. An aqueous crude mixture is first prepared from the resin solution, the fillers and the other additives. The formulation to be used (relative to solid resin) corresponds to the formulation indicated for the dry process. The aqueous crude mixture is converted, for example by means of a mixing screw, into moist granules, which are then dehydrated to a residual moisture content of approx. 2 to 6% at temperatures of approx. 50° to 100° C. The adjustment of the desired degree of condensation takes place simultaneously in the course of this.

Moldings of a very wide variety of types can be produced from the molding compositions by shaping and by the application of temperatures of approx. 100° to 180° C. and pressures of 150–800 bar, preferably 200–400 bar. The moldings are produced in a manner which is in itself known, for example by the compression molding process, the transfer molding process or the injection molding process.

In the compression molding process the molding composition is introduced, in a granulated or tableted form, into the cavity of a heatable compression mold. The formation of the molding takes place, after closing the compression mold, at temperatures of, for example, 120°–170° C. and pressures of 200 to 400 bar; after being released from the mold the molding must still be deflashed. In the transfer molding process the molding composition is first pre-plasticized in a screw extruder at elevated pressure and elevated temperature and is discharged in the form of a ribbon. The ribbon is divided into portions while still hot, and the portions fall straight into open compression molds in which they are shaped under elevated pressure and at elevated temperature to give moldings.

In the injection molding process the rolling composition is also first plasticized in a screw extruder, but is then injected via flow channels into closed dye molds in which final curing takes place at temperatures of 120°–170° C. and pressures of 200 to 400 bar.

The molding cycle in the production of moldings is usually approx. 30 seconds to approx. 5 minutes.

The molding compositions produced using the resins according to the invention exhibit a high flow, but are less reactive than molding compositions which have been prepared from resins of a higher formaldehyde content. It can, therefore, be advantageous in certain circumstances to add curing agents which are in themselves known during the production of the molding compositions, in order to accelerate the rate of curing in the subsequent final curing, without increasing the melt viscosity appreciably. The following are examples of suitable curing agents: melamine salts of organic acids, such as, for example, melamine phthalate, melamine oxalate or melamine acetate, the morpholine salt of p-toluenesulfonic acid, arylsulfonic acid esters, such as, for example, methyl, ethyl or phenyl p-toluenesulfonates, succinic anhydride, phthalic anhydride, maleic anhydride, benzenetetracarboxylic acid anhydride, polyphosphoric acid esters or a mixture of formic acid and hydrogen peroxide. The formic acid in this mixture is, as a rule, 85% strength, the hydrogen peroxide is 30% strength and the formic acid and hydrogen peroxide are mixed in the ratio of 1:0.75.

Molding compositions which have been produced using the resins according to the invention exhibit better values of shrinkage during processing and after-shrinkage (for example the after-shrinkage is ≦0.4%) than molding compositions based on conventional melamine resins, and a better behavior in fire than the molding compositions based on the resins of German Offenlegungsschrift No. 2,824,473. The mechanical properties of the moldings produced using the resins according to the invention meet the requirements of the DIN Standards.

The invention is illustrated in greater detail by means of the examples which follow. The percentages quoted are percentages by weight.

EXAMPLE 1:

2,577 g of distilled water, 1,923 g of 39% strength aqueous formaldehyde solution, 3,000 g of melamine (melamine:formaldehyde molar ratio 1:1.05), 37 g of N,N-dimethylaminoethanol (described below as dimethylethanolamine or DMEA) and 350 g of ethyl triglycol are introduced into a closable, pressure-resistant 20 liter vessel made of stainless steel and equipped with a stirrer, a thermometer, a sight glass, a means of illumination, a device for heating and cooling, a safety valve operating at 5 bar, a manometer, an inlet nozzle and a bottom valve. The pH value was 10.1. After the vessel had been closed, the temperature was raised to 120° C., while stirring. After the condensation reaction temperature of 120° C. had been reached, the melamine dissolved in the course of 6 minutes. Condensation was carried out for a further 12 minutes at a temperature of 120° to 125° C., while stirring, until the resin had reached a dilutability with water of 1:0.7 at 20° C. The excess pressure in the kettle was 2.0 to 2.5 bar at this stage. The condensation reaction was terminated by switching on the cooling. The resulting clear resin solution had a dilutability with water of 1:0.25 at 20° C. and had a solids content of 50%.

Part of the resin solution obtained was dried in a thin film at a temperature of 50° C. under a water pump vacuum and was then pulverized.

Further resins were prepared in an analogous manner under the conditions indicated in Table 1.

70 parts of resin, 30 parts of cellulose, 1 part of zinc stearate and X parts of curing agent are milled on a roll mill at 110° C. to give a rough sheet. After the rough sheet has been granulated, a molded piece is prepared in a mold for a standard test bar at 150° to 155° C., 250 bar and a molding cycle of 8 minutes. The quantities of curing agent and the results obtained on the standard test bars produced are listed in Table 2.

The production of the type 182 molding compositions was carried out similarly, except that here a mixture of a resin according to the invention and a phenolic resin was employed.

TABLE 2

| Resin No. | Employed in the form of | Curing agent | Type of moulding composition as specified in DIN 7708 | After-shrinkage as specified in DIN 53,464, in % | Tracking resistance as specified in DIN 53,480 |
|---|---|---|---|---|---|
| 1 | P | | 182 | 0.35 | KC 600 and KA3c |
| 2 | P | 1% PA | 152 | 0.11 | KC 600 and KA3c |
| 3 | F | 1% M | 152 | 0.35 | KC 600 and KA3c |
| 4 | P | 0.65% M | 152 | 0.3 | KC 600 and KA3c |
| 5 | P | 1% M | 152 | 0.4 | KC 600 and KA3c |
| 6 | F | — | 152 | 0.3 | KC 600 and KA3c |
| 7 | P | — | 152 | 0.4 | KC 600 and KA3c |
| 8 | P | 1% M | 152 | 0.36 | KC 600 and KA3c |
| 9 | P | 1.5% PA | 152 | 0.4 | KC 600 and KA3b |

P = powder resin
F = liquid resin
PA = phthalic anhydride
M = melamine phthalate

What is claimed is:

1. A modified melamine-formaldehyde resin in powder form having a melamine:formaldehyde molar ration of 1:(1.27 to 0.7) and a content of 1 to 25% by weight, relative to the total weight of melamine and formaldehyde, with formaldehyde being calculated as 100% strength, of one or more glycol ethers of the formula I $$R(OCH_2CH_2)_nOH \qquad (I)$$

in which R denotes alkyl having 1 to 4 C atoms and n denotes an integer from 1 to 5, and/or of p-toluenesulfonamide.

TABLE 1

| No. | Melamine: formaldehyde molar ratio | Modifying agents | pH value | Base used for adjusting the pH | Condensation reaction temperature in °C. | Excess pressure during the condensation reaction, in bar | Dilutability with water at 20° C. |
|---|---|---|---|---|---|---|---|
| 2 | 1:1.2 | 15% E. 2% P[1] | 10.5 | KOH | 115–130 | 1.7–2.3 | 1:0.55 |
| 3 | 1:1.2 | 15% E. 2% P | 9.2 | KOH | 115–119 | 1.3–1.6 | 1:0.5 |
| 4 | 1:1.2 | 10% E. 2% P | 9.5 | KOH | 111–120 | 1.4–1.8 | 1:0.5 |
| 5 | 1:1.2 | 5% E. 5% P | 9.4 | KOH | 115–116 | 1.4–1.6 | 1:1.1 |
| 6 | 1:1.2 | 15% E | 9.9 | DMEA | 114–119 | 1.5–1.8 | 1:0.6 |
| 7 | 1:1.2 | 5% P | 9.5 | KOH | 110–111 | 1.1–1.3 | 1:0.75 |
| 8 | 1:0.9 | 5% E. 5% P | 9.8 | KOH | 110–125 | 1.3–2.2 | 1:0.4 |
| 9 | 1:0.8 | 19% E. 5% P | 10.1 | DMEA | 108–130 | 1.0–2.8 | 1:0.1 |
| 10 | 1:1.05 | 10% E | 9.9 | DMEA | 116–117 | 1.6–1.8 | 1:0.6 |

[1]added subsequently
E = "ethylpolyglycol" =
70% by weight of ethyldiglycol
20% by weight of ethyltriglycol
10% by weight of ethyltetraglycol
P = p-toluenesulfonamide Molding compositions of type 152 and type 182 as specified in DIN No. 7708 were prepared in order to determine after-shrinkage as specified in DIN No. 53,464 and tracking resistance as specified in DIN No. 53,480. Molding compositions of type 152 were prepared in accordance with the following directions:

2. A melamine-formaldehyde resin as claimed in claim 1, wherein the melamine:formaldehyde molar ratio is 1:(1.25 to 1.01).

3. A melamine-formaldehyde resin as claimed in claims 1 or 2, which in liquid form has a dilutability with water of 1:(0.1 to 4), preferably 1:(0.1 to 3).

4. A melamine-formaldehyde resin as claimed in claims 1 or 2, which, relative to the quantities of melamine-formaldehyde used for its production, contains 1 to 25% by weight, preferably 2 to 15% by weight, of modifying agents, but in this respect not more than 1% by weight of sulfamic acid or salts thereof, and preferably not more than 0.5% by weight of sulfamic acid or salts thereof.

5. A molding composition comprising 35 to 60 parts by weight of a resin, calculated as solid, as claimed in claim 1, 65 to 40 parts by weight of filler and about 1 part by weight of lubricant.

6. A molding composition according to claim 5 further comprising at least member selected from the group of flow assistants, pigments and curing agents.

7. A melamine-formaldehyde resin as claimed in claim 1 or 2, wherein the content of one or more glycol ethers of the formula I and/or of p-toluenesulfonamide is 2 to 15% by weight, relative to the total weight of melamine and formaldehyde with formaldehyde being calculated as 100% strength.

8. A melamine-formaldehyde resin as claimed in claim 3 wherein the content of one or more glycol ethers of the formula I and/or of p-toluenesulfonamide is 2 to 15%, by weight, relative to the total weight of melamine and formaldehyde with formaldehyde being calculated as 100% strength.

9. A process for the preparation of the melamine-formaldehyde resins as claimed in claim 1 or 2 which comprises heating melamine in an aqueous solution or suspension with formaldehyde in a melamine:formaldehyde molar ratio of 1:(1.27 to 0.7), preferably 1:(1.25 to 1.01) at a pH value of 8 to 11 and at temperatures of 105° to 160° C. until the finished resin has reached a dilutability with water of 1:(0.1 to 4) at 20° C. and thereafter drying the liquid resin to obtain the resin in powder form and adding before, during or after the condensation reaction, 1 to 25% by weight, relative to the total weight of melamine and formaldehyde, with formaldehyde being calculated as 100% strength, of one or more glycol ethers of the formula I $$R(OCH_2CH_2)_nOH \qquad (I)$$

in which R denotes alkyl having 1 to 4 carbon atoms and n denotes an integer from 1 to 5, and/or of p-toluenesulfonamide.

10. The process as claimed in claim 9, wherein the condensation reaction is carried out at temperatures of 110° to 130° C.

11. The process as claimed in claim 9, wherein the condensation reaction is carried out at a pH value of 8.5 to 10.5.

12. A molding composition according to claim 5 or 6 obtained by mixing the recited components, calendering the mixture for 1 to 3 minutes at 70° to 140° C., cooling and comminuting the mixture.

* * * * *